US011247397B1

United States Patent
Snyder et al.

(10) Patent No.: US 11,247,397 B1
(45) Date of Patent: Feb. 15, 2022

(54) SYSTEM AND METHOD FOR MANEUVERING A WORK PLANE TO ENABLE A MANUFACTURING PROCESS ON MULTIPLE SIDES OF THE WORK PLANE

(71) Applicant: MADE IN SPACE, INC., Moffett Field, CA (US)

(72) Inventors: Michael P. Snyder, Jacksonville, FL (US); Vernon B. Bussler, Merced, CA (US); Jared O. Leader, Rochester, NY (US)

(73) Assignee: REDWIRE SPACE, INC., Jacksonville, FL (US)

(*) Notice: Subject to any disclaimer, the term of this patent is extended or adjusted under 35 U.S.C. 154(b) by 334 days.

(21) Appl. No.: 16/202,696

(22) Filed: Nov. 28, 2018

Related U.S. Application Data

(60) Provisional application No. 62/591,274, filed on Nov. 28, 2017.

(51) Int. Cl.
*B29C 64/245* (2017.01)
*B33Y 30/00* (2015.01)
*B29C 64/20* (2017.01)
*B29C 64/241* (2017.01)
*B29C 64/106* (2017.01)

(52) U.S. Cl.
CPC .......... *B29C 64/245* (2017.08); *B29C 64/106* (2017.08); *B29C 64/20* (2017.08); *B33Y 30/00* (2014.12); *B29C 64/241* (2017.08)

(58) Field of Classification Search
CPC ..... B29C 64/245; B29C 64/241; B29C 64/20; B33Y 30/00
See application file for complete search history.

(56) References Cited

U.S. PATENT DOCUMENTS

| | | | | |
|---|---|---|---|---|
| 3,269,024 A | * | 8/1966 | Fischer | G01C 25/00 33/301 |
| 2015/0110912 A1 | * | 4/2015 | Okamura | B29C 64/393 425/162 |
| 2016/0031156 A1 | * | 2/2016 | Harkness | B29C 64/20 264/427 |
| 2016/0052205 A1 | * | 2/2016 | FrantzDale | B29C 64/20 264/401 |
| 2016/0288416 A1 | * | 10/2016 | Robles Flores | B33Y 50/00 |
| 2018/0065180 A1 | * | 3/2018 | Machida | B29C 64/209 |
| 2019/0240903 A1 | * | 8/2019 | Isobe | B29C 64/245 |

* cited by examiner

*Primary Examiner* — Joseph S Del Sole
*Assistant Examiner* — Jerzi H Moreno Hernandez
(74) *Attorney, Agent, or Firm* — Terry M. Sanks, Esq.; Beusse Sanks, PLLC

(57) ABSTRACT

An additive manufacturing device build platform is disclosed having a build area having an initial build surface, the initial build surface further having an outer area that is separable from the initial build area for use as a secondary build surface, the outer area having a rotation mechanism wherein the secondary build surface is locatable in a different plane away from the initial build surface by placement of the outer area with the rotation mechanism. Another system and method are also disclosed.

12 Claims, 8 Drawing Sheets

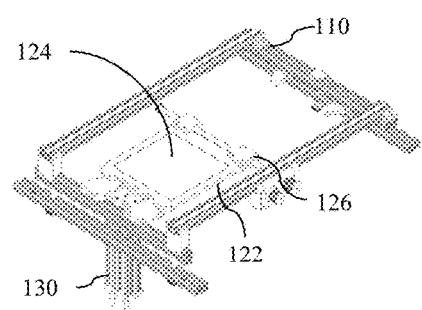 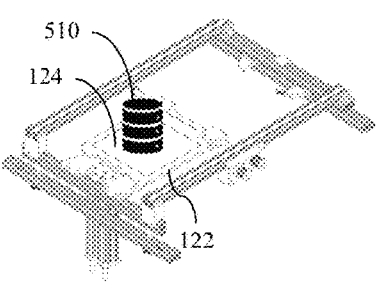 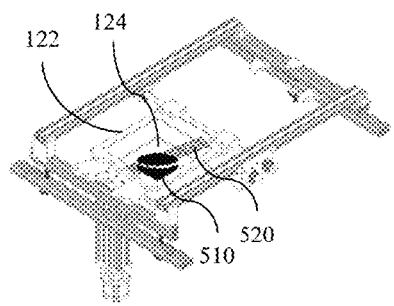
FIG. 5A　　　　FIG. 5B　　　　FIG. 5C
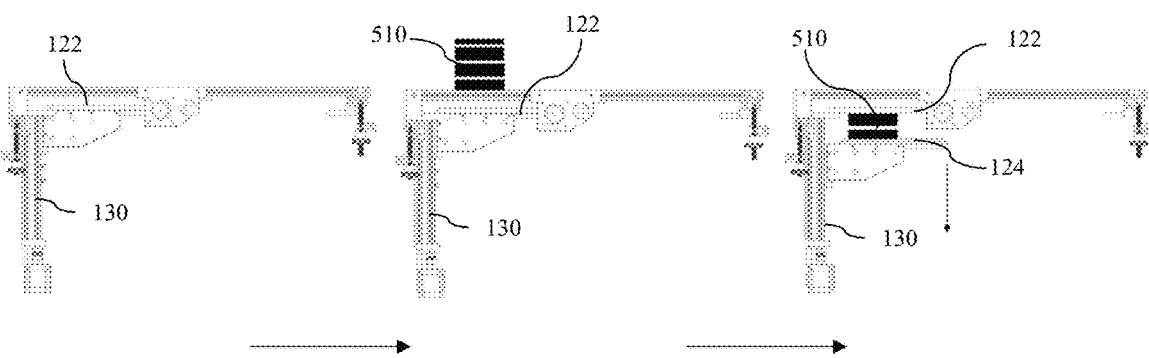
FIG. 5D　　　　FIG. 5E　　　　FIG. 5F

 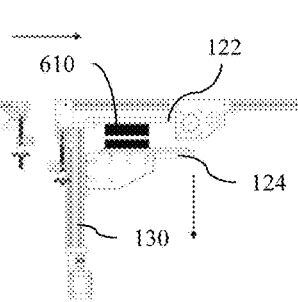 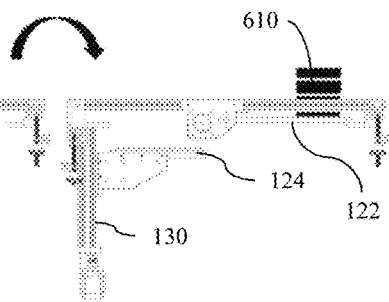
FIG. 6A　　　　　　　FIG. 6B　　　　　　　FIG. 6C
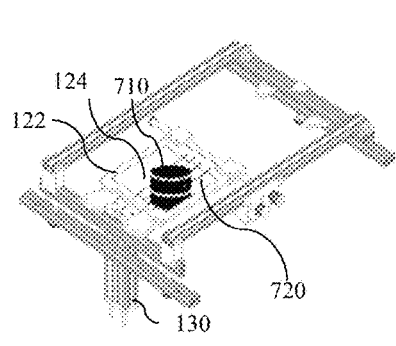 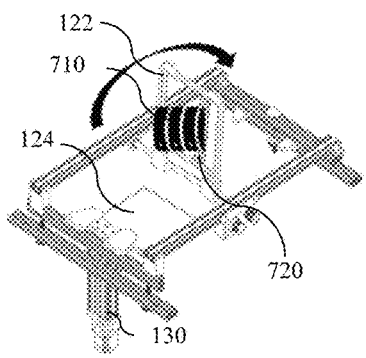 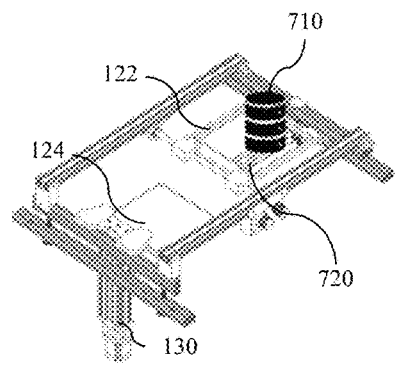
FIG. 7A　　　　　　　FIG. 7B　　　　　　　FIG. 7C

US 11,247,397 B1

SYSTEM AND METHOD FOR MANEUVERING A WORK PLANE TO ENABLE A MANUFACTURING PROCESS ON MULTIPLE SIDES OF THE WORK PLANE

CROSS-REFERENCE TO RELATED APPLICATIONS

This application claims the benefit of U.S. Provisional Application No. 62/591,274, filed Nov. 28, 2017, and incorporated herein by reference in its entirety.

BACKGROUND

Embodiments relate to manufacturing on a surface and, more particularly, to a system and method to manufacture a work plane about one more axes to enable access by a tool on both sides of a work plane.

Many manufacturing processes include a surface onto which a part being manufactured is built or rests. The surface is used to support the part during the manufacturing process. Traditional manufacturing has a designated "base" which is not moved throughout the manufacturing process.

A type of manufacturing that is growing in use and popularity is additive manufacturing. Currently, additive manufacturing only works on one side of a work plane, restricting possible geometries and requiring support materials. Support materials are additive manufactured supports that are created while the actual part is being created to provide for support to the part being created during the manufacturing process. Having to create the support materials prolongs the time it takes to create the part. Also, in addition to support materials, components or parts with more complex geometries usually require multipart prints to ensure all aspects of the component or part are included. Also, only one "print head" assembly can run at a time with current additive manufacturing technologies.

Manufacturing in reduced gravity or fluctuating gravity environments can be challenging. Additive manufacturing is a type of manufacturing that has been demonstrated by the Assign that works in a micro-gravity environment. Additive manufacturing techniques enable the rapid creation of objects, structures, portions thereof, prototypes, replacement parts, experimental parts and make-shift items. Additive manufacturing devices may produce parts via additive processes. Material may sequentially be bonded or otherwise mechanically or chemically joined together in order to form a desired object. One class of additive manufacturing devices, fused deposition modeling (FDM) devices, utilizes a source of thermoplastics to produce parts. An extrusion nozzle is positioned and heated to a temperature that will melt supplied thermoplastic. Thermoplastic is fed through the nozzle, thereby depositing a desired amount of molten plastic at a location in order to form a portion of a part. Other additive processes use powders or granular material to produce parts. One class of additive manufacturing devices, selective laser melting (SLM) generally fuses fine metal powders together with a high power laser. One class of additive manufacturing devices, stereolithography (SLA), generally cures a photoreactive resin with an ultraviolet (UV) laser or other radiation source.

Users of additive manufacturing would benefit from a system and method that allows for deposition to occur on many sides of an item being created during a single operation in which little to no human or outside robotic involvement is required.

SUMMARY

Embodiments relate to a system and method to enable additive manufacturing deposition to occur on a plurality of sides, at least a top side and bottom side, of a component during a single operation. The system comprises a build area having an initial build surface to support a component build with an additive manufacturing process, the initial build surface further comprising an outer area that is separable from the initial build area for use as a secondary build surface, the outer area comprising a rotation mechanism wherein the secondary build surface is locatable in at least one different plane away from the initial build surface by placement of the outer area with the rotation mechanism.

Another system comprises a flipping build area to locate a part being created with an additive manufacturing process, wherein the flipping build area further comprises a support surface onto which the part is initially manufactured and a rotation platform adjacent to the support surface to support the part after being initially manufactured, the rotation platform is arranged to rotate about at least a first axis and a second axis to position the part in a plurality of positions after being initially manufactured.

The method comprises building a component with an additive manufacturing process of an additive manufacturing device on a build area, the build area having a first build surface that has a second build surface located along at least one edge of the first build surface wherein the component is initially built on the first build surface. The method further comprises separating the build area into the first build surface and the second build surface with the component remaining on the first build surface. The method also comprises additively manufacturing a support material between the component and the second build surface that is attached to the component. The method also comprises moving the second support surface to result in a side of the component previously resting on the first build surface to be exposed to the additive manufacturing process.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIGS. 4A-4F show an embodiment of a part being created and initial movement of the flipping build area;

FIGS. 5A-5F show an embodiment of a component being created where support material is used;

FIGS. 6A-6C show an embodiment of a part being created where the part is flipped;

FIGS. 7A-7C show an embodiment of the flipping of a component;

DETAILED DESCRIPTION

Figure 1:
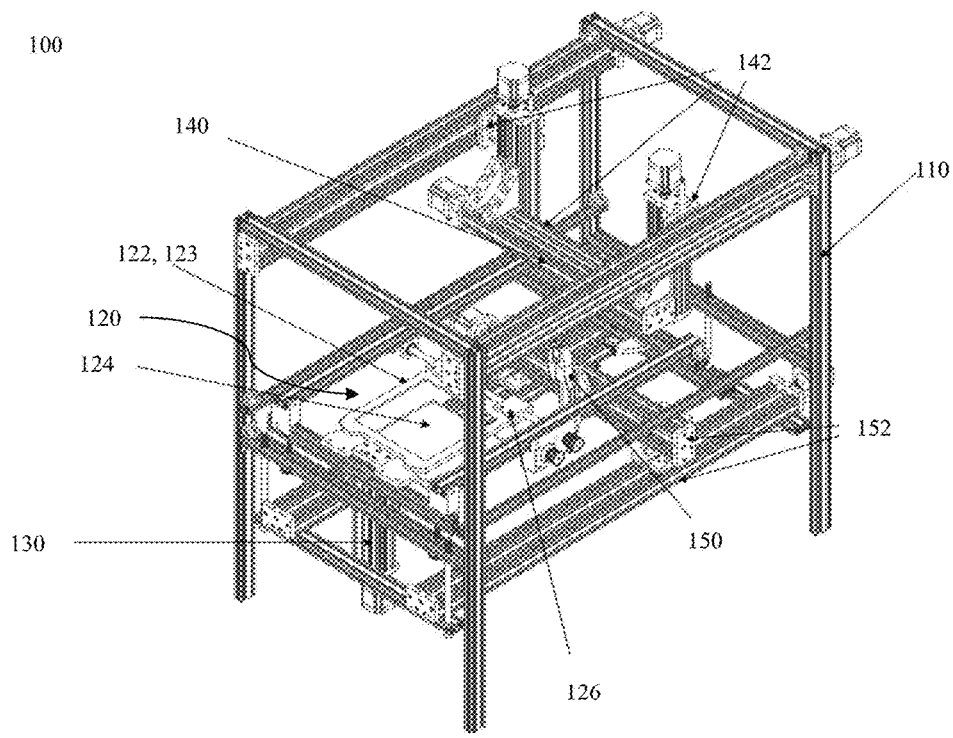
FIG. 1 shows an embodiment of an additive manufacturing device with a flipping build area.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

As used herein, the term "print," or any variation thereof, in the context of additive manufacturing will be understood to mean the process of creating a part by any additive manufacturing process.

FIG. 1 shows an embodiment of an additive manufacturing device 100 with a structure 110 and a flipping build area 120. The flipping build area 120 comprises a rotation platform 122 that may surround a support surface 124. In other embodiments, the rotation platform 122 may have only parts, support edges 123, located at define locations around the support surface 124. As used herein, the phrases "support surface" and "support platform" are used interchangeably. As will be disclosed further herein, the rotation platform 122 is the part of the flipping build area 120 that actually rotates in a flipping motion. The support surface 124 is arranged to lower away from the rotation platform 122. A rotation mechanism 126 may be provided to cause the rotation platform 122 to rotate or flip about a first axis (shown in FIG. 3B). A second rotation mechanism 127 may be provided to cause the rotation platform 122 to rotate or swivel about a second axis (as shown in FIG. 3D). A support surface traverse system 130 may be included to allow the support surface 124 to at least one of lower and rise, causing separation from the rotation platform 122.

In an embodiment, a first deposition system 140 and a second deposition system 150 are disclosed. It may be appreciated that the number of deposition system is non-limiting and that more than two deposition systems may also be used. In the above mentioned embodiment, the first deposition system 140 has a first traverse system 142 and the second deposition system 150 has a second traverse system 152 to move the respective deposition system to a location to provide for additive manufacturing where the location is determinative of where an additive layer is to be applied. Subtractive manufacturing systems, manipulations systems (e.g., robotic manipulators, pick and place systems), coating systems, heat treatment systems, and the like may be included in addition to or in lieu of the deposition system(s).

Figures 2A, 2B, 2C:
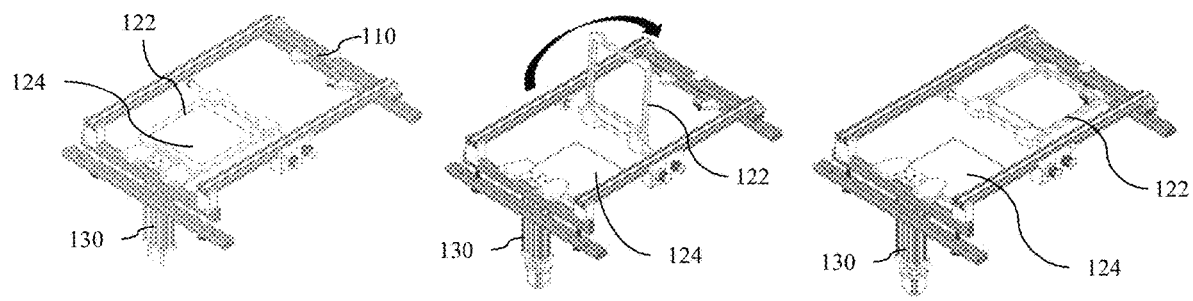
FIGS. 2A-2C show an embodiment of the flipping build area going through flipping steps.

FIGS. 2A-2C show an embodiment of the flipping build area 120 going through the flipping steps translating the flipping build area 120 through a plurality of positions. As shown, the support surface 124 may be surrounded by the rotation platform 122. The rotation platform 122 may be able to rotate, or flip resulting in the rotation platform 122 being located away from the support surface 124. In an embodiment, as further disclosed herein and as suggested above, the support surface 124 may be lowered away from the rotation platform 122, before the rotation platform 122 rotates, or flips. In another embodiment, the support surface 124 may be raised away from the rotation platform 122, before the rotation platform 122 flips.

Figure 3A:
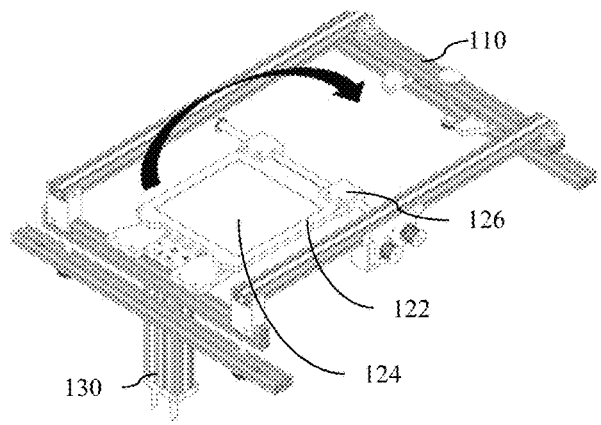
FIGS. 3A-3D show an embodiment of the flipping build area going through flipping steps.
Figure 3B:
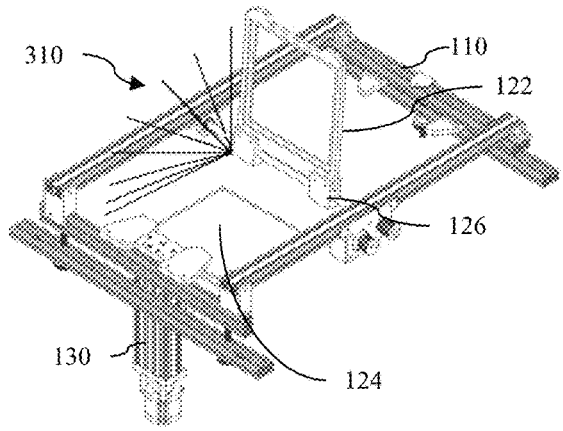
Figure 3C:
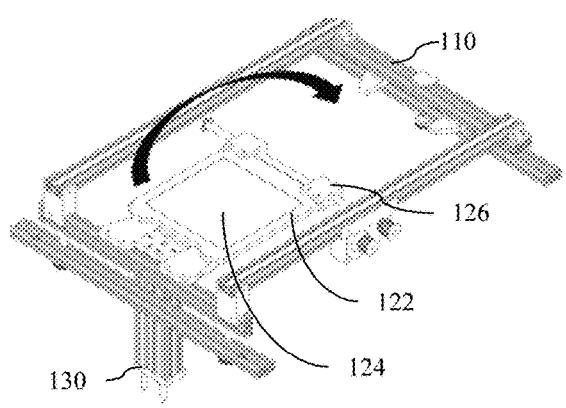
Figure 3D:
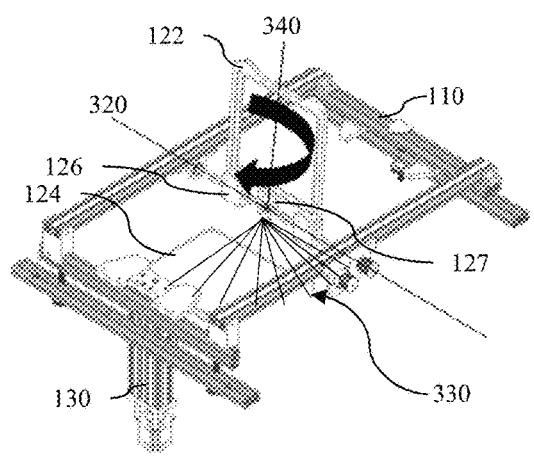

FIGS. 3A-3D show an embodiment of the flipping build area 120 rotating about more than one axis. FIGS. 3A and 3B show the rotation platform 122 in a plurality of first rotational positions 310 along the first axis 320. FIGS. 3C and 3D show the rotation platform 122 in a plurality of first rotational positions 310 along the first axis 320 and a plurality of second rotational positions 330 along the second axis 340. It may be appreciated that the number of axes of rotation is non-limiting. Thus, as explained further herein, when a part, or component, being manufactured is attached to the rotation platform 122, the part may be rotated to a plane about the first axis 320 and rotated to a plane about the second axis 340. The component may be held at any plane while additional additive manufacturing is performed to a particular surface of the part. Thus, as a non-limiting example, if the manufacturing plan includes building a main body and then having a secondary body extend from the main body, the part may be orientated using the embodiments disclosed herein to locate the main body with respect to the additive manufacturing build tool to create the additive manufacturing secondary body as part of the main body.

Thus, as shown in FIG. 3B, the rotation mechanism 126 may be provided to cause the rotation platform 122 to rotate or flip about a first axis 320. Also, as shown in FIG. 3D, the second rotation mechanism 127 may be provided to cause the rotation platform 122 to rotate or swivel about a second axis 340. When rotating with the second rotation mechanism 127, the rotation platform 122 is separated from or disengaged from the first rotation mechanism 126. In an embodiment, the rotation mechanism may be viewed as a singular unit with a first sub-rotation mechanism 126 to locate or rotate the outer area, rotation platform, 122 about a first axis 320 and a second sub-rotation mechanism 127 to locate the outer area, rotation platform, 122 about the second axis 340.

Figures 4A, 4C, 4D:
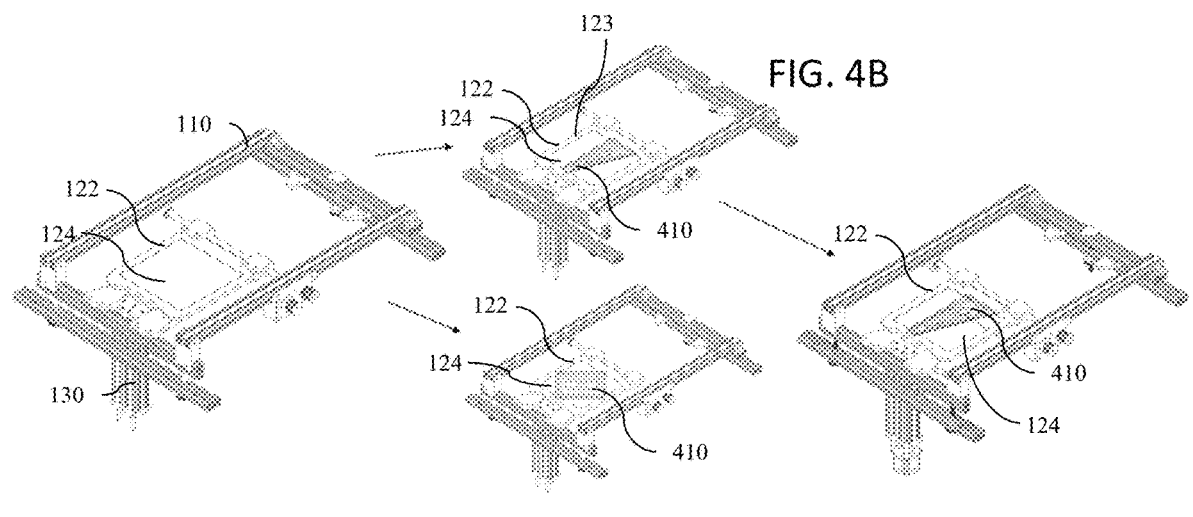

FIGS. 4A-4F show an embodiment of a component 410 being created and initial movement of the flipping build area 120. FIGS. 4A-4F are prior to flipping the component 410. As shown in FIG. 4A, an initial arrangement is provided. As discussed above, the support surface 124 and rotation platform 122 are nested to create a flush surface to print upon. As shown in FIG. 4B, material is deposited on the support surface 124 and across to the rotation platform 122 to create a particular geometry for the component 410 which may be used to hold a part built only upon the support surface 124.

Figure 4E:
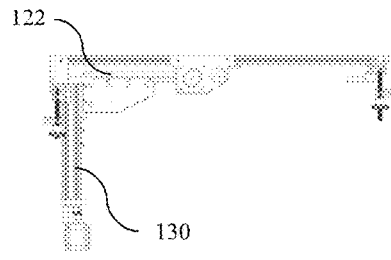
Figure 4F:
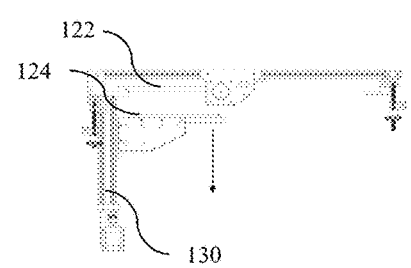

FIG. 4C shows that a plurality of geometric shapes are possible for creation. FIG. 4D shows that the support surface 124 may be lowered causing the created component to remain attached to the rotation platform 122. FIGS. 4E and 4F show an embodiment of a side view of the embodiments shown in FIGS. 4A-4D. FIG. 4E shows the support surface 124 initially flush with the rotation platform 122. FIG. 4F shows the support surface 124 being further lowered away from the rotation platform 122 wherein the component 410 remains attached to the rotation platform 122.

FIGS. 5A-5F show an embodiment of a component 510 being created where support material 520 is used. As with respect to FIGS. 4A-4F, the embodiments shown in FIGS. 5A-5F are prior to flipping the component 510. As shown in FIG. 5A, an initial arrangement is provided. As discussed above, the support surface 124 and rotation platform 122 are nested to create a flush surface to print upon. As shown in FIG. 5B, material is deposited on the build surface to create a particular geometry for the component 510. FIG. 5C shows the support surface 124 lowered and support material 520 applied to attach the component 510 to the rotation platform 122. FIGS. 5D-5F show an embodiment of a side view of the embodiments shown in FIGS. 5A-5C. FIG. 5D shows the support surface 124 initially flushed with the rotation platform 122 before the component 510 is being built. FIG. 5E shows the support surface 124 initially flushed with the rotation platform 122 and the component 510 on the support surface 124. FIG. 5F shows the support surface 124 lowered away from the rotation platform 122 and the component 410 (though invisible) is attached to the component 510 as the support surface 124 is separated from the rotation platform 122. The component 510 may be moved about either of the axes, such as those disclosed in FIGS. 3A-3D to further create the component 510.

In an embodiment, the flipping build area functions by exposing the underside of a component 410 being manufactured and then flipping the rotation platform 122 over and adding material on the underside of the part. This is achieved by having two nested geometries, namely, the support surface 124 and the rotation platform 122. The support surface 124 and the rotation platform 122 are initially flush creating a flat surface to print upon. Once a part is completed, or is at a designated build amount, on one side, support material 520 may be placed across the rotation platform 122 with the part flush to the rotation platform 122 to be attached to the support material 520.

The support material 520 may span the entirety of the support platform, the adhesion between the support platform and the support material 520 attached to the part may be greater than the adhesion between the support surface 124 and the underside of the part. This allows the support surface 124 to pull away exposing the underside of the part (which would normally be concealed by the support surface 124) for printing. The support platform may then be rotated about an axis 320, 340 allowing for the part to be printed on both sides.

As discussed above, the support platform may also be rotated about at least a first and second axis 320, 340 to allow for the print to be printed on any surface, other than the top side and bottom side which is shown above. Furthermore, the embodiments disclosed herein may be used in less than Earth gravity such as, but not limited to, micro-gravity. In a micro-gravity environment, the embodiments disclosed herein provide for a support material 520 that may be able to hold heavier components 510 with less material. FIGS. 6A-6C show an embodiment of a part being created where the part is flipped. FIGS. 6A-6C are taken from a side view. Once the component 610 is created while the support surface 124 and rotation platform 122 are flush with each other, as shown in FIG. 5A, the support surface 124 may be lowered, as shown in FIG. 5B. Though not shown in FIG. 5B, support material 620 may be applied to connect the component 510 to the rotation platform 122. As shown in FIG. 6C, the rotation platform 122 may be flipped, resulting in the component 510 no longer resting on the support surface 124.

FIGS. 7A-7C show a perspective view of an embodiment of the flipping of a component 710. As shown in FIG. 7A, the component 710 has been lowered and support material 720 connecting the component 710 to the rotation platform 122 has been added. FIG. 7B shows an embodiment of the rotation platform 122 being translated from a position in relation to the support surface 124, where the component 710 still rested on the support surface 124, to a location where the component 710 no longer rests on the support surface 124. FIG. 7C shows the component 710 and rotation platform 122 in another plane different from the support surface 124. The support material 720 is providing a build surface for the component 710 as the support material 720 is attached to the rotation platform 122.

Thus, as disclosed above, the flipping build area 120 may comprise an initial build surface that has an outer area that is separable from the build area for use as a secondary build surface. The secondary build surface is locatable in a different plane away from the initial build surface. As the secondary build surface is transitioned to the different plane away from the initial build surface, a component being built is translated to a different orientation so that a surface originally resting against the initial build surface is exposed for continued manufacturing on the originally resting surface.

Figure 8:
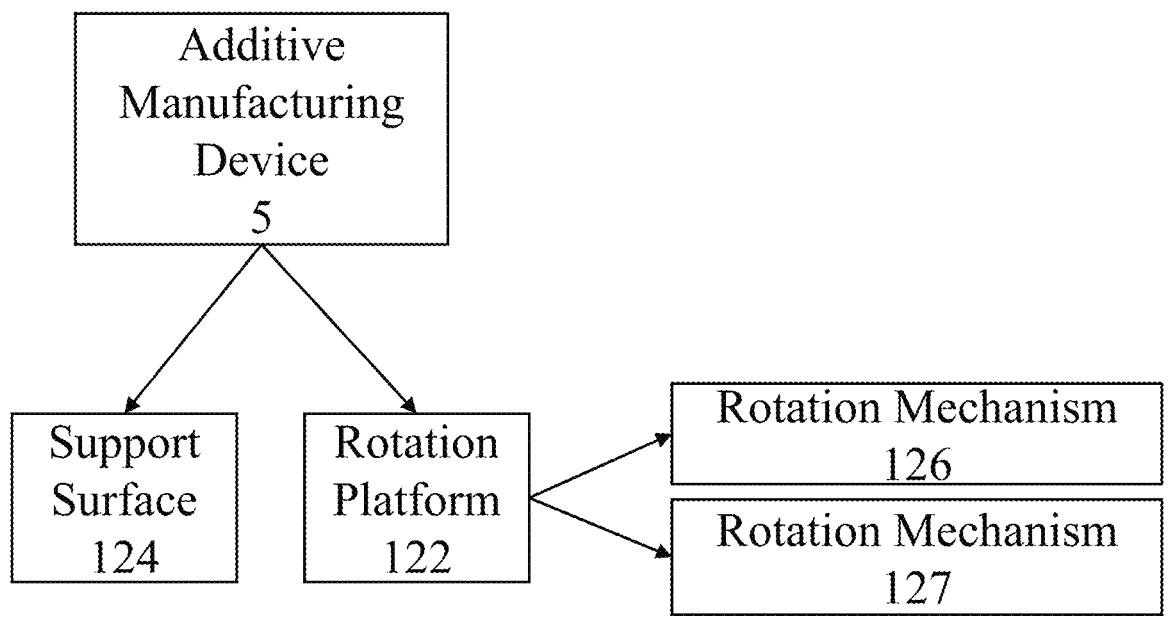
FIG. 8 shows a block diagram of an embodiment of the complete manufacturing system.

FIG. 8 shows a block diagram of an embodiment of a system including an additive manufacturing device. The system 3 discloses an additive manufacturing device 5 which may be any one of or a combination of a fused deposition modeling (FDM) device which utilizes a source of thermoplastics to produce parts from an extrusion nozzle that is positioned and heated to a temperature that will melt a supplied thermoplastic. Thermoplastic is fed through the nozzle, thereby depositing a desired amount of molten plastic at a location in order to form a portion of a part or component; an additive manufacturing device that uses powders or granular material to produce parts; a selective laser melting (SLM) additive manufacturing device that generally fuses fine metal powders together with a high power laser; or a stereolithography (SLA) additive manufacturing device that generally cures a photoreactive resin with an ultraviolet (UV) laser or other radiation source.

As further shown and discussed above, the additive manufacturing device produces a part on support surface 124. Support material 520 may be applied to the rotation platform 122 onto which the part or component 510 is attached and is held to the rotation platform 122 when the rotation platform is moved with the rotation mechanism 126, 127. In an embodiment, the support surface 124 is not used. Instead, the rotation platform, with an opening where a support surface 124 may have been able to have been located, is the complete build area. The support material 520 is applied to the support edges 123 of the rotation platform 122. The component 510 is built directly upon the support material 520. However, in this embodiment, more material for the support material 520 may be needed to provide a base upon which the component 510 sits or rests. Therefore, this embodiment may be best utilized in situations where a base of the component 510 does not require a large base.

Figure 9:
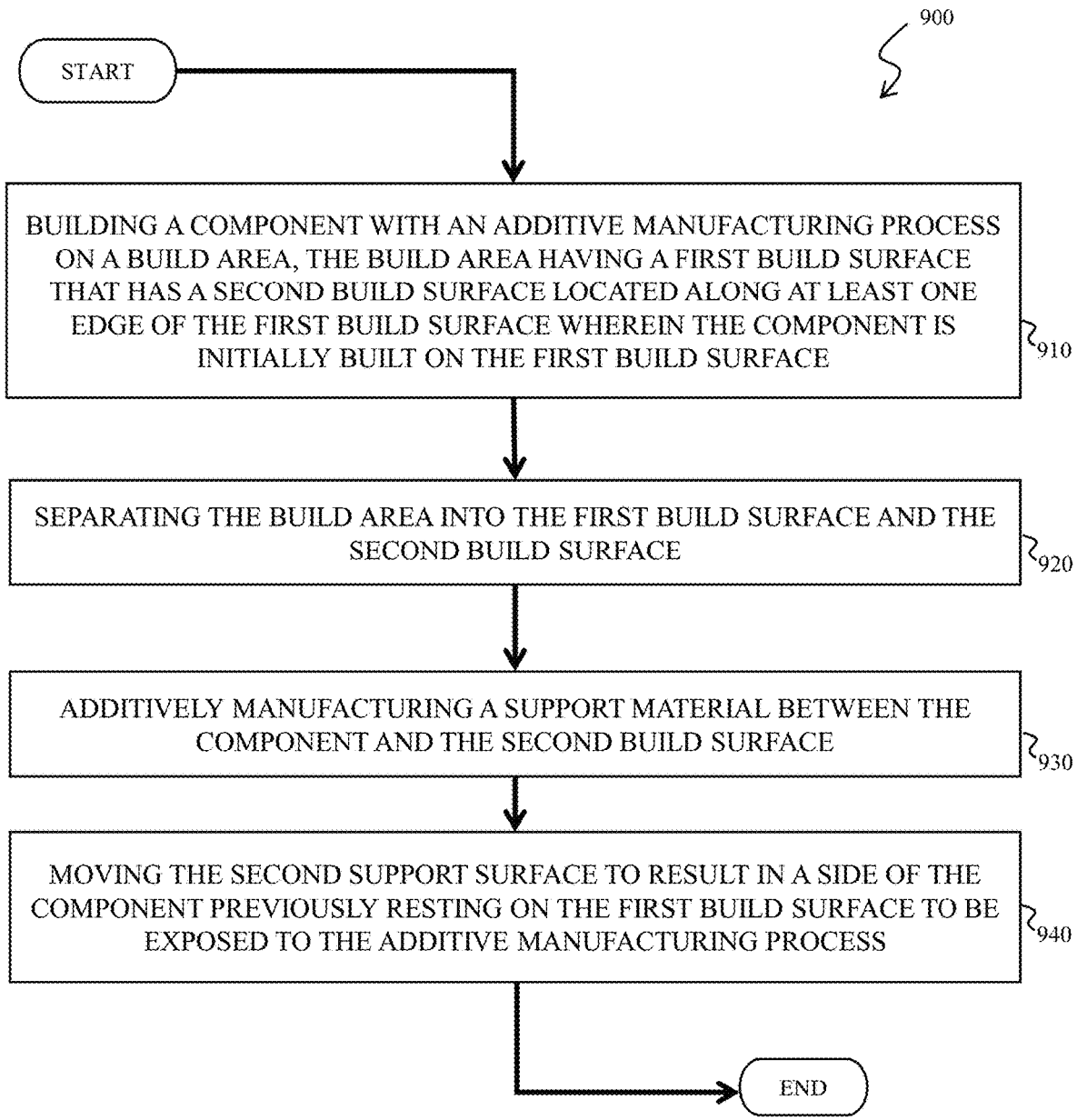
FIG. 9 shows a flowchart of an embodiment of a method.

FIG. 9 shows a flowchart of an embodiment of a method for building a component with an additive manufacturing process. In step 910, the method 901 comprises a component is built with an additive manufacturing process on a build area, the build area has a first build surface that has a second build surface located along at least one edge of the first build surface wherein the component is initially built on the first build surface. In step 920, the build area is separated into the first build surface and the second build surface. Separating may be done by lowering the first build surface from the second build surface. Then, in step 930, support material 520 is additively manufactured between the component and the second build surface. In step 940, the second support surface is moved to cause a side of the component previously resting on the first build surface to be exposed to the additive manufacturing process.

The flipping build area provides printing on both a bottom plane, where the components meets a surface and a top plane, expanding what is possible for an additive manufacturing printer or process. While using the flipping build area, as disclosed above, may still require the use of both support materials and multipart prints to ensure all aspects of the component or part are included, it is possible to reduce or eliminate their use. It may be appreciated that the embodiments disclosed above allow for creating multi-layered circuit boards with a single machine during a continuous build process. Furthermore, embodiments do not result in limiting the manufactured product's geometry by having a required surface that is bound to a printing bed. Thus, instead of being limited to a ground-up build process, embodiments disclosed herein provide for a middle-out manufacturing process.

The deposition systems are thus enabled on both the top and bottom of a manufactured component to allow for complex operations such as utilizing a pick and place on one side and a conductive trace manufacturing technology on the other side allowing for electronics to be manufactured seamlessly. A flipping build area could have applications in many 3D printing operations. The increased complexity of available geometries, coupled with the decreased need for support material, and completely new geometries (especially with multiple materials) makes this a useful development. Along with multiple sides being worked on simultaneously.

Figure 10:
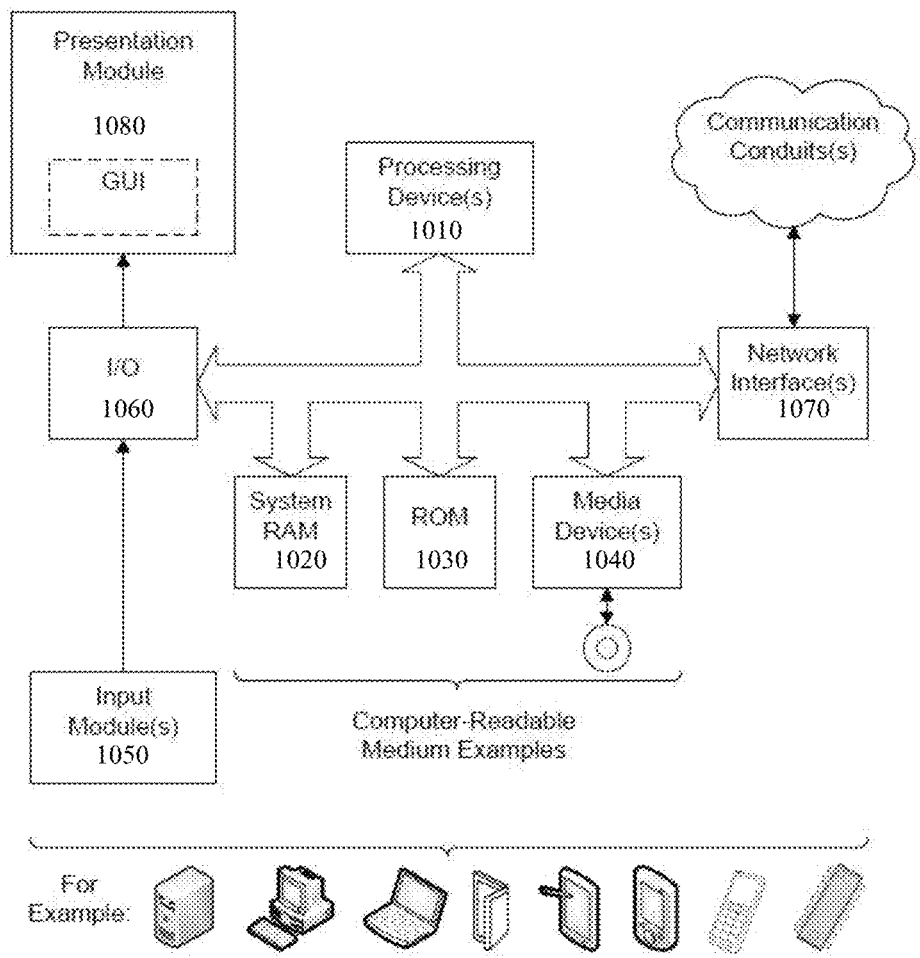
FIG. 10 shows a basic configuration of a computing device.

Referring now to FIG. 10, in a basic configuration, a computing device may include any type of stationary computing device or a mobile computing device. The computing device may be part of a process to determine when and/or to implement any function of the embodiments disclosed above such as, but not limited to, at least one of separating the build area into the first build surface and the second build surface, additively manufacturing a support material between the component and the second build surface, and moving the second support surface to result in a side of the component previously resting on the first build surface to be exposed to the additive manufacturing process. Thus, as a non-limiting example, the basic confirmation may be used to control the additive manufacturing device 5 and determine when to at least one of lift and lower the support surface 124, and rotate the rotation platform 122.

The computing device may include one or more processors 1010 and system memory in a hard drive. Depending on the exact configuration and type of computing device, system memory may be volatile 1020 (such as RAM), non-volatile 1030 (such as read only memory (ROM), flash memory, and the like) or some combination of the two. A system memory may store an operating system, one or more applications, and may include program data for performing flight, navigation, avionics, power managements operations such as for space operations.

The computing device may carry out one or more blocks of a process and or the additive manufacturing processes described herein. The computing device may also have additional features or functionality. As a non-limiting example, the computing device may also include additional data storage devices 1040 (removable and/or non-removable) such as, for example, magnetic disks, optical disks, or tape. The computer storage media may include volatile and non-volatile, non-transitory, removable and non-removable media implemented in any method or technology for storage of data, such as computer readable instructions, data structures, program modules or other data. The system memory, removable storage and non-removable storage are all non-limiting examples of computer storage media. The computer storage media may include, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

The computing device may also include or have interfaces for input device(s) 1050 (not shown) such as a keyboard, mouse, pen, voice input device, touch input device, etc. The computing device may include or have interfaces for connection to output device(s) 1080 such as a display, speakers, etc. The computing device may include a peripheral bus for connecting to peripherals. Computing device may contain communication connection(s) 1070 that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device may include a network interface card to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

What is claimed is:

1. A system comprising a build area having an initial build surface to support a component being built with an additive manufacturing process and an outer area having a first position surrounding a plurality of sides of the initial build surface as the component is built and that is configured to separate from the initial build surface to provide a secondary build surface to build the component, the outer area comprising a rotation mechanism, wherein the secondary build surface is locatable to a second position to continue building the component in at least one different plane away from and above the initial build surface by placement of the outer area with the rotation mechanism.

2. The system according to claim 1, wherein the rotation mechanism comprises a first sub-rotation mechanism to rotate the outer area about a first axis and a second sub-rotation mechanism to rotate the outer area about a second axis.

3. The system according to claim 1, further comprising at least one of a lowering device configured to lower the initial build surface below the outer area and a lifting device configured to raise the initial build surface.

4. The system according to claim 1, wherein the outer area comprises support edges configured to receive an additive manufactured support material to which the component being additively manufactured is attached to prior to rotating the outer area away from the initial build surface to the second position.

5. The system according to claim 1, further comprising an additive manufacturing device to provide for the additive manufacturing process.

6. A system comprising a flipping build area to locate a part being created with an additive manufacturing process, wherein the flipping build area comprises a support surface having an area onto which the part is initially manufactured and a rotation platform including support edges adjacent to and surrounding the area of the support surface and to support the part after being initially manufactured, the rotation platform is arranged to rotate the support edges about at least a first axis and a second axis to position the part in a plurality of positions after being initially manufactured to continue building the part away from the support surface.

7. The system according to claim 6, wherein the first axis is in a first plane and the second axis is in a second plane which bisects the first plane.

8. The system according to claim 6, wherein the rotation platform comprises a rotation mechanism configured to rotate the rotation platform about the first axis and about the second axis.

9. The system according to claim 8, wherein the rotation mechanism comprises a first sub-rotation mechanism to rotate the rotation platform about the first axis and a second sub-rotation mechanism to rotate the rotation platform about the second axis.

10. The system according to claim 6, further comprising at least one of a lowering device configured to lower the support surface below the rotation platform and a lifting device to raise the support surface.

11. The system according to claim 6, wherein the rotation platform comprises surface edge to receive an additive manufactured support material applied by an additive manufacturing device to which the part being additively manufactured is attached to the manufactured support material prior to rotating the rotation platform about at least one of the first axis and the second axis.

12. The system according to claim 6, further comprising an additive manufacturing device to provide the additive manufacturing process.

* * * * *